July 10, 1962 A. F. MEYER 3,043,599
FRAMELESS TRANSPORTATION TANKS
Filed June 29, 1959 4 Sheets-Sheet 3
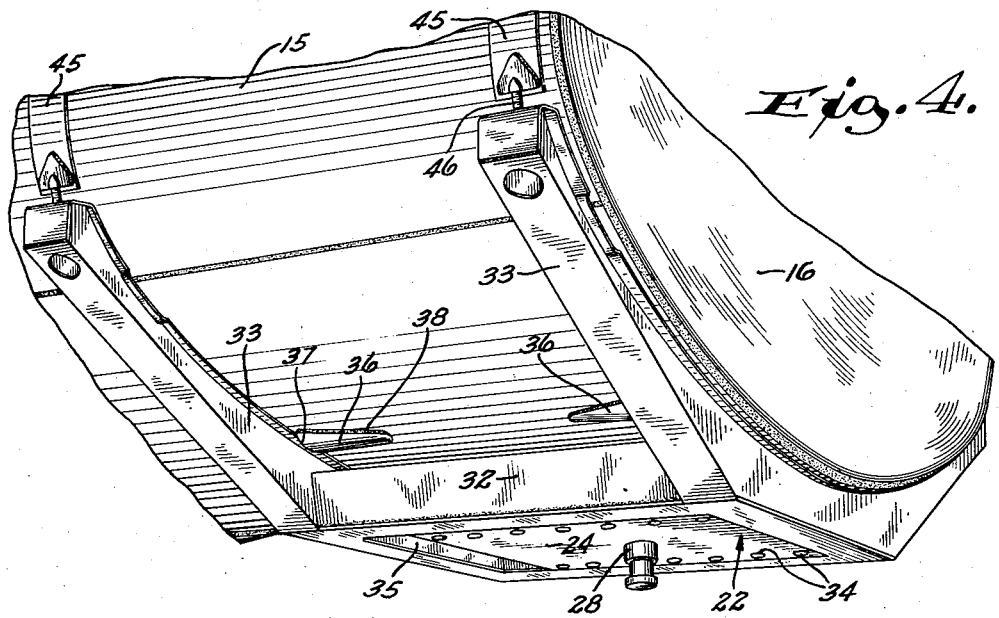
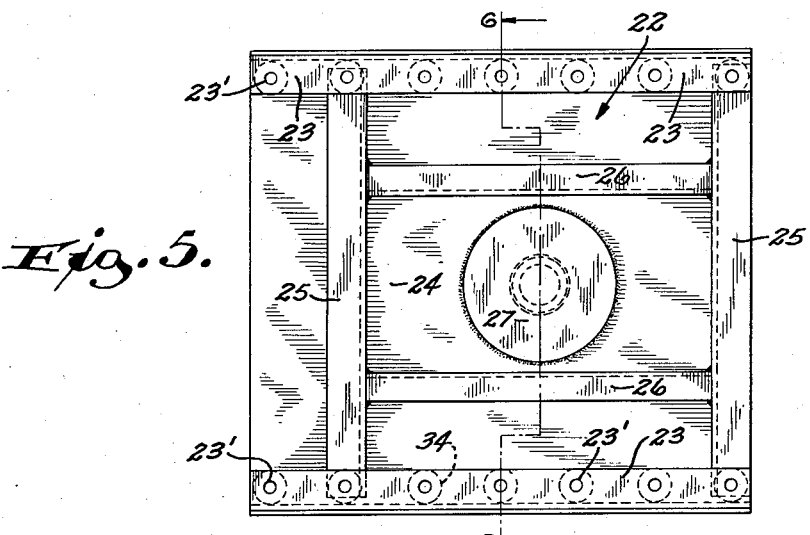
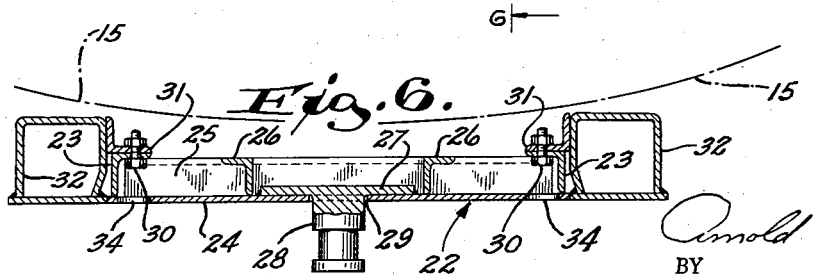
INVENTOR
Arnold F. Meyer
BY
Morsell & Morsell
ATTORNEYS.

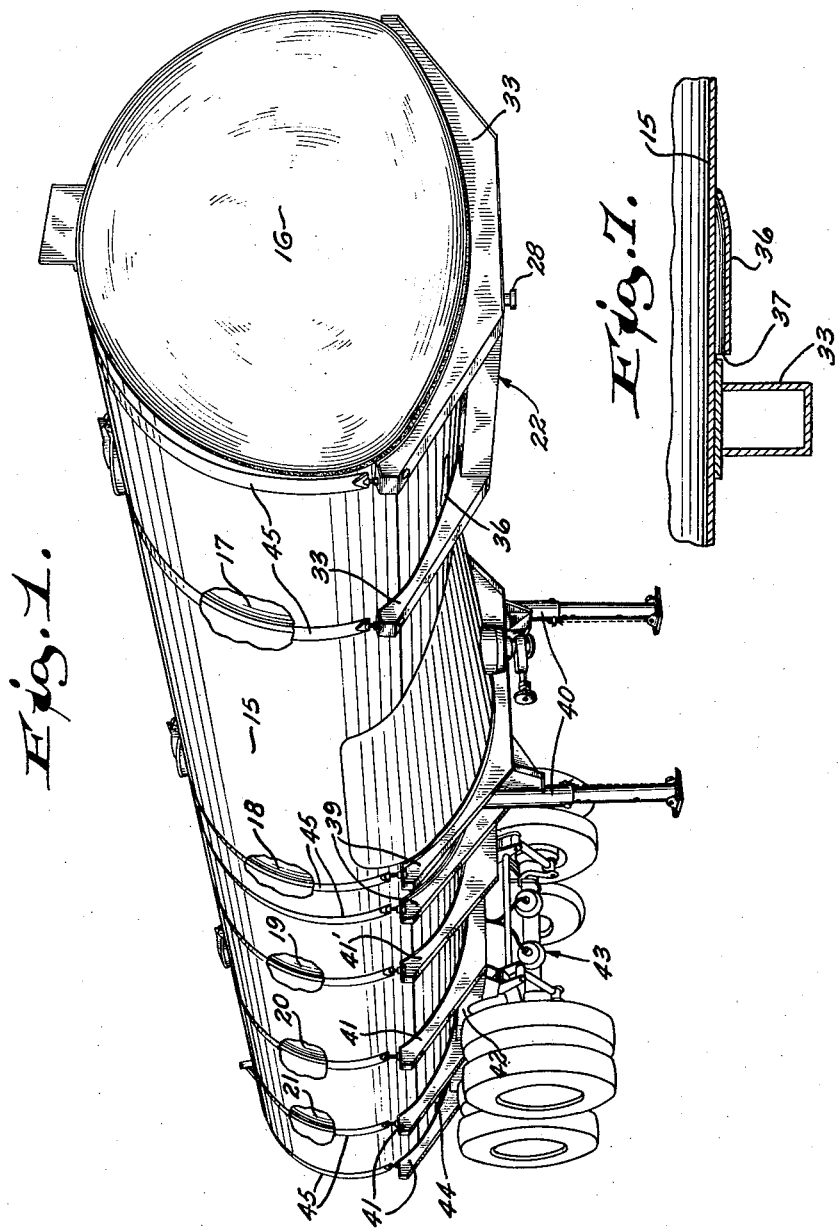

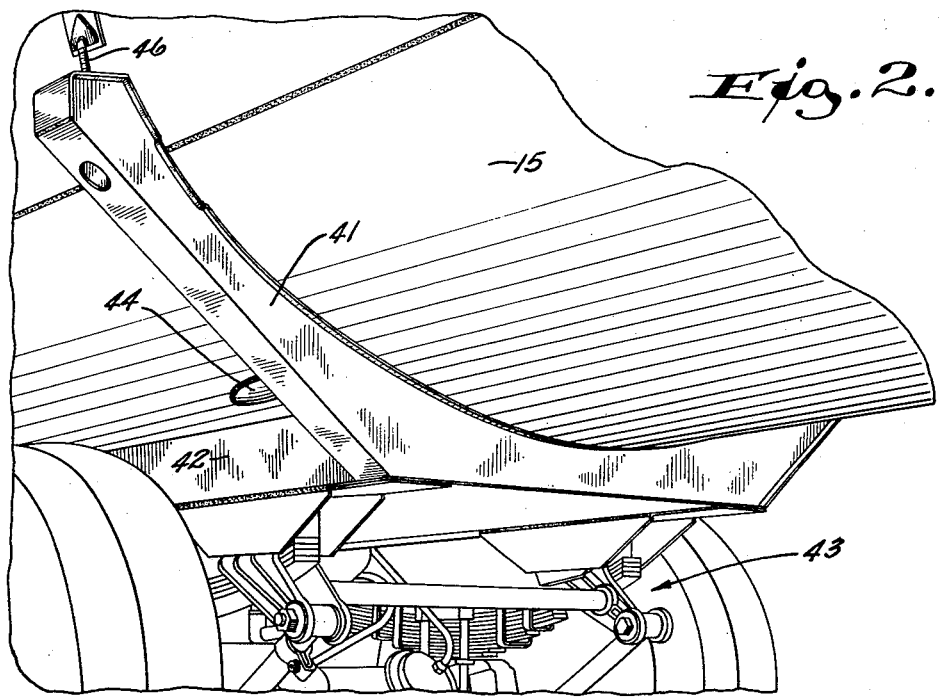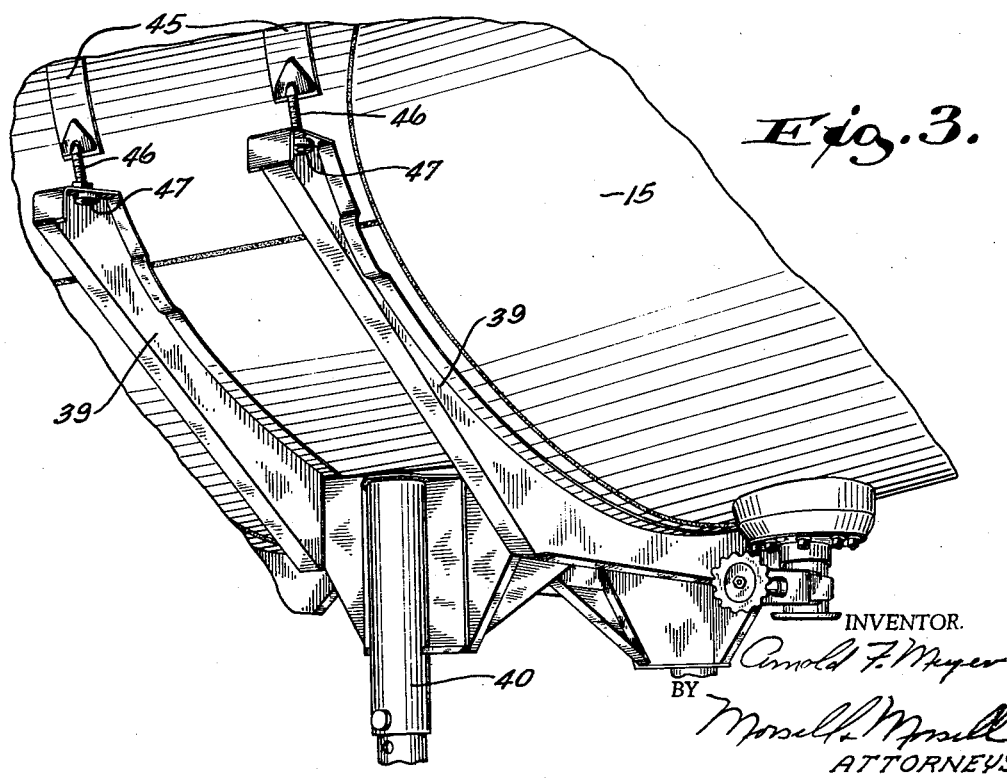

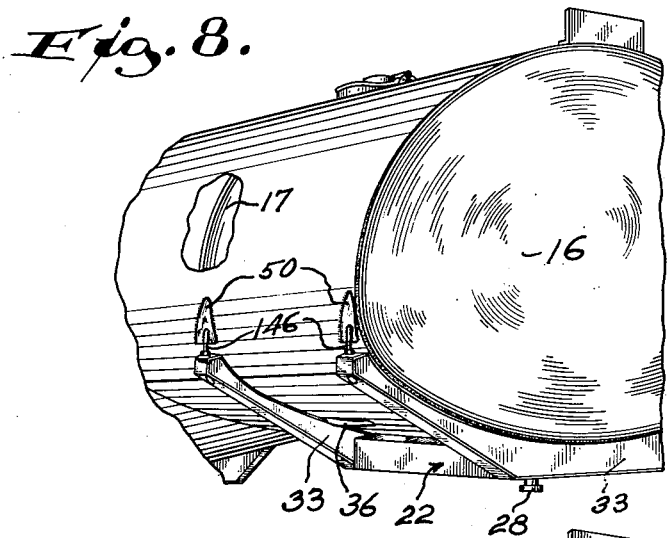
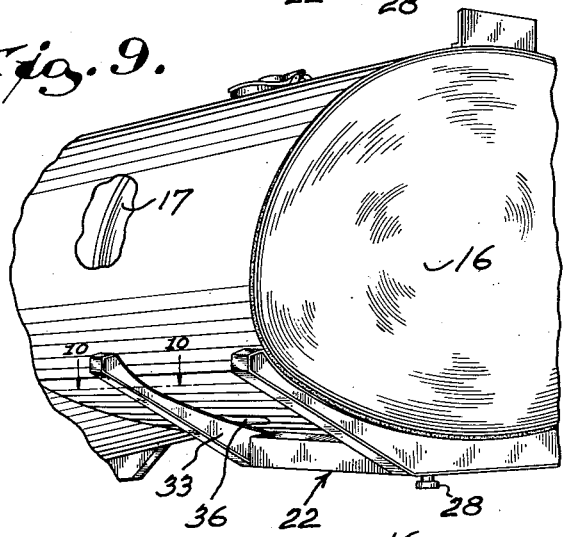
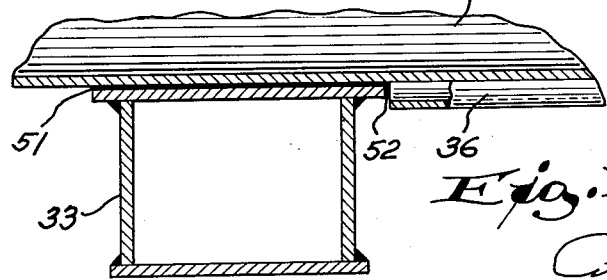

United States Patent Office 3,043,599
Patented July 10, 1962

3,043,599
FRAMELESS TRANSPORTATION TANKS
Arnold F. Meyer, Pewaukee, Wis., assignor to The Heil Co., Milwaukee, Wis., a corporation of Wisconsin
Filed June 29, 1959, Ser. No. 823,737
6 Claims. (Cl. 280—5)

This invention relates to frameless transportation tanks and more particularly to means for supporting liquid cargo containers for transportation on the highway.

It is common practice to use the container as a self-supporting structure in transportation tanks, as disclosed in Kramer Patent No. 1,815,625, and Meyer Patent No. 2,113,796. In such practice the support load-transfers are accomplished by welding, either of the transverse members as shown in the Meyer patent, FIG. 4, or of the longitudinal members as disclosed in said Kramer patent, FIG. 2 to the container.

Since the revenue producing cargo is limited by the gross vehicle weight in each state by road law, there is a need for the lightest practical cargo tank. This requires the lightest practical skin and the least possible structure.

When welding thin materials, the stresses produced by the temperature differentials which are required to weld result in distortion of the skin. This distortion tends to produce areas concave to the surface which are exposed to the liquid; or it produces buckles that are unstable to the liquid pressure. Furthermore, as a vehicle is propelled over the highway it is subjected to vertical acceleration producing surges in hydraulic pressure of as high as 150% of the static pressure. In thin skinned containers this produces distortion, and serious local stress can be produced in areas concave to the liquid pressure which ultimately result in metal fatigue and local failure. Such obvious concave areas as are visible can be removed by mechanical working of the metal which has been shrunk by the welding operation. This involves individual judgment as to the seriousness of the distortion, as well as additional cost.

It is a general object of the present invention to eliminate as much welding as possible on the skin of the container to reduce distortion in the skin to a minimum, while producing a transportation vehicle which will withstand all of the stresses to which it is subjected in use.

The most serious problem in presently employed practices is involved in the welding of structural elements to the container. These elements generally transmit localized support loads from the fifth wheel and from the rear trailer axle suspension into the container.

The structural elements on heads or on this shell in conventional structures generally produce areas of relatively rigid local stiffness which, in turn, result in localized stress concentrations of a relatively unknown stress level. Some metals, particularly aluminum, are "notch" sensitive and such localized points of rigidity produce areas where fatigue failures can be experienced due to these concentrated stresses.

In the present invention all structural elements of a rigid nature are separate from the cargo container. The loads of support, draft loads, and braking loads are transmitted principally by bearing and friction, except that novel shear plates are employed which may transmit some shear loads through a weld. The container, a semi-monoque structure required to contain the cargo, is adequate to support itself when the localized loads of the fifth wheel, landing gear, and rear axle suspension are adequately distributed into the heads and into the shear stable portions of the tank shell.

A further object of the invention is to provide a frameless transportation tank which makes it possible to use lightweight aluminum for the tank proper, and which eliminates the distortion which normally results when attempting to weld an aluminum alloy tank to the transverse and longitudinal structural members as in a conventional structure.

A more specific object of the present invention is to provide a structure as above described wherein the tank is supported in cradles and wherein the longitudinal shifting of the tank body during acceleration or deceleration is prevented by means of novel shear plates which are welded to the tank body but which are of such limited size as to cause no objectionable distortion as a result of said welding.

With the above and other objects in view, the invention consists of the improved frameless transportation tank, and all of its parts and combinations, as set forth in the claims, and all equivalents thereof.

In the accompanying drawings illustrating one complete embodiment of the preferred form of the invention, in which the same reference numerals designate the same parts in all of the views:

FIG. 1 is a perspective view of a trailer tank embodying the present invention;

FIG. 2 is a fragmentary perspective view showing the cradle structure associated with the main wheel assembly;

FIG. 3 is a fragmentary perspective view showing a landing gear and its cradles;

FIG. 4 is a fragmentary perspective view showing the fifth wheel assembly and its cradles;

FIG. 5 is a top view of the fifth wheel plate alone;

FIG. 6 is a sectional view taken on the line 6—6 of FIG. 5, also showing the connection to the longitudinal support members, portions of the tank being shown by dot and dash lines;

FIG. 7 is a fragmentary longitudinal section through the bottom of the tank to show a typical shear plate arrangement;

FIG. 8 is a fragmentary perspective view at the front of a trailer showing a modification;

FIG. 9 is a view similar to FIG. 8 showing still another modification; and

FIG. 10 is a fragmentary sectional view taken on line 10—10 of FIG. 9.

Referring more particularly to the drawing, the numeral 15 designates a trailer tank, preferably a thin skinned metal container. The invention has its greatest applicability to tanks which have been formed of aluminum alloy for the purposes of reducing weight, as it is in aluminum alloy tanks where distortion problems have been most acute when attempting to utilize conventional welded constructions. The tank includes front and rear end heads 16 and there are longitudinally spaced surge baffles or bulk heads 17, 18, 19, 20 and 21 (see FIG. 1) of conventional design. The bulkheads or surge baffles are suitably welded in position as are the end heads, outlet openings and fill cover flanges. In addition, there is conventional welding at the seams. The welding required at these locations produces no particular problem.

Referring now more particularly to FIGS. 1, 4, 5 and 6, there is a fifth wheel plate as shown in FIGS. 5 and 6 designated generally by the numeral 22. It comprises spaced side angles 23 welded to the top side of a bottom plate 24 adjacent its side edges, and having longitudinally spaced bolt holes 23′. Additional angle members 25 extend transversely of the plate 24 and they, in turn, are connected by longitudinal angle members 26. Between the longitudinal members is a welded in place kingpin disc 27 having a center kingpin 28 which projects through a hole 29 in the fifth wheel plate 24. The fifth wheel plate assembly shown in FIG. 5 is bolted as at 30 to the flanges of angle members 31 which are supported by box section longitudinal support members 32, one on each side, which extend between and are welded at their ends to bolsters 33, as shown in FIG. 4, which bolsters form a cradle shaped to conform to the curvature of the lower portion of the front end of the tank 15 of FIGS. 1 and 4. It will be noted from FIGS. 4 and 6 that the longitudinal members 32 which connect the two bolsters 33 are completely out of contact with the tank so that in the assembly of FIG. 4 the load is carried in bearing and in shear by the cradle only.

In connecting the fifth wheel assembly of FIG. 5 to the cradle assembly, the bolts 30 may be pushed up through the relatively large openings 34 in the bottom plate 24. It will be noted from FIG. 4 that the assembly of FIG. 5 is so assembled that there is a space 35 at the rear of FIG. 4. In this position the kingpin 28 is thrown to a forward position. By installing the assembly of FIG. 5 in a reverse position with the space at the front rather than at the rear, the position of the kingpin 28 can be reversed. In addition, due to the use of the plurality of bolt holes in the flanges of the angle members 31, the fifth wheel plate may be longitudinally adjusted to suit conditions.

The longitudinal box section members 32 perform a dual function. First, they connect the two bolsters 33 and brace the latter, and second, they furnish support for the fifth wheel plate which makes it possible for the latter to be simpler and lighter in constructure. Heretofore, fifth wheel plates had to span a 34" gap in order to reach from one longitudinal to the other in a conventional frame type of trailer.

In view of the fact that sudden acceleration or deceleration of the vehicle is likely to cause the tank 15 to shift longitudinally on the cradles, the present invention provides a novel solution for this problem in a very simple manner. Referring to FIG. 4, there are relatively small metal shear plates 36 substantially triangular in shape having straight abutment ends 37, the plates being welded as at 38 to the bottom of the tank. For the fifth wheel cradle there is a pair of shear plates 36 on each side of the fifth wheel plate, those on one side only being shown in FIG. 4. Due to the small size of the plates 36, the welding at 38 produces no substantial buckling problem. The ends 37 of these plates serve as abutments to prevent shifting of the tank relative to the bolsters 33, as is obvious from FIGS. 4 and 7, where it may be seen that the abutment-ends will engage the flanges of the bolsters if there is relative shifting.

It is to be noted from FIG. 1 that the front bolster of the fifth wheel cradle is relatively close to the forward end of the tank where the tank structure is reinforced by the flanges of the end head 16. The other bolster 33 of the fifth wheel cradle is underneath a portion of the tank which is reinforced by a bulkhead or surge plate 17.

Referring now to FIG. 3, another pair of bolsters 39 are employed, one on each side of the landing gear assemblage 40, to form a welded-together cradle with the cradles the only portion of the assemblage which contacts the tank. This cradle is preferably positioned so that at least one of the bolsters 39 is directly below a portion of the tank which is reinforced by a bulkhead or surge baffle such as the bulkhead 18 of FIG. 1.

Referring now to FIG. 2 showing the main wheel assembly, there are three spaced bolsters 41 connected by and integral with longitudinal box members 42 which are spaced below and out of contact with the tank proper just as are the longitudinal members 32 of FIG. 4. In certain constructions two bolsters may be sufficient. The bolsters 41 and longitudinal members 42 form understructure connected with the main wheel assembly 43. In order to prevent relative longitudinal shifting between the tank and the understructure of FIG. 2, shear plates 44 are welded to the underside of the tank on both sides of the vehicle in the same manner as the shear plates 36 of FIG. 4, with the ends of the plates forming abutments against two or more of the bolsters 41 to prevent shifting of the tank in the cradle formed by the bolsters 41.

The rearmost bolster 41 is positioned beneath that portion of the tank which is reinforced by the flange of the rear head of the tank, the intermediate bolster 41 is beneath the bulkhead 21, and the front bolster 41 is beneath that portion of the tank which is reinforced by a bulkhead or surge baffle 20. One or more additional bolsters 41' may be employed if desired, where there is other understructure, and the additional bolster shown is positioned underneath the portion of the tank which is reinforced by the bulkheads 19 and may be used to help support a box or the like. The bolsters form the only portions of the main wheel assembly which contact the tank.

There is a metal strap 45 for each bolster. Both ends of each strap have bolts 46 which extend through holes at the ends of the bolster and which are adapted to receive nuts 47. These straps extend over the tank and constitute the sole means for connecting the tank to the cradles.

In the modification illustrated in FIG. 8 a substitute for the straps 45 is shown. In lieu of these straps small anchor plates 50 are welded to opposite sides of the tank, as illustrated, and are located in low stressed shear areas so that the limited amount of welding will create no problems. These plates have depending bolts 146 which extend into holes in the ends of the bolsters 33 and which are provided with the usual take-up nuts, like the nuts 47 shown in FIG. 3.

Another modification is illustrated in FIGS. 9 and 10. Here also the bands extending over the tank are eliminated. Instead, the tank is adhesively bonded to the bolsters by the use of an adhesive 51 applied to the entire top surface of each bolster. This adhesive may be an epoxy resin or a vinyl phenolic such as Goodyear's "Pliobond," Chrysler's "Cycleweld," or Goodrich's "Plastilock." In the claims the term "adhesive" does not include welding. In order to insure against relative longitudinal shifting between the tank and the under structure, and to prevent shearing stresses on the adhesive, the shear plates 36, identical to the shear plates described in connection with the principal form of the invention and shown in FIG. 4 are utilized, and the adhesive is caused to fill in the gap between the ends of the shear plates and the bolsters as at 52.

While the front only of a trailer tank has been illustrated in FIGS. 8 and 9, it is to be understood that where the construction of FIG. 8 is used it may be employed in connection with all of the bolsters, including the bolsters 39, 41 and 41' of FIG. 1. Likewise, where the construction of FIG. 9 is employed, it will be employed in connection with all of said bolsters illustrated in FIG. 1.

From the above it is apparent that a frameless understructure comprising separate longitudinally spaced supporting devices has been provided, which lends adequate support for a thin wall tank such as aluminum, with all welding between the understructure and the tank eliminated. Heretofore, attempts to support trailer tanks on cradles have all been in conjunction with a frame type of vehicle having longitudinally extending frame members beneath the entire length of the tank. With the present invention such longitudinal members are eliminated and a frameless construction is provided where the load is distributed between the several bearing cradles with all loads carried in bearing and in shear thus eliminating any localized loading on the tank.

With the present invention, because of the elimination of welding between the understructure and the tank, there is no distortion or residual stress due to heat from such welding.

With the present invention it is possible to provide a lightweight aluminum tank in a frameless type of construction to thereby substantially reduce the gross vehicle weight and make it possible to carry a maximum pay load while still complying with state laws.

It is to be understood that the present invention is not to be limited to the exact details of construction shown and described, for obvious modifications will occur to persons skilled in the art.

What I claim is:

1. In a transportation vehicle having a container, frameless understructure comprising separate longitudinally spaced supporting device each having a cradle engaging beneath said container, one of said cradles comprising longitudinally spaced, transverse, relatively narrow, parallel load-carrying bolsters fitting close against the container; transversely spaced, longitudinally extending support members connecting said bolsters and spaced out of contact with the container, said support members having inner sides and bottom faces; angle members secured to the inner sides of said support members and having flanges above said bottom faces with bolt holes, which flanges project toward one another; a fifth wheel plate of less length than said longitudinal support members; angle members secured to side portions of said plate and having flanges spaced above said plate and formed with bolt holes; bolts engageable with selected bolt holes in the support member angle members securing the latter to the angle members of the plate for adjustably and reversibly connecting the fifth wheel plate in position, said plate having openings positioned to provide access to said bolts; and means securing the container to said cradles.

2. In a transportation vehicle having a container, frameless understructure comprising separate longitudinally spaced supporting devices each having a cradle engaging beneath said container, one of said cradles comprising longitudinally spaced, transverse, relatively narrow, parallel load-carrying bolsters fitting close against the container; transversely spaced, longitudinally extending support members connecting said bolsters and spaced out of contact with the container, said support members having inner sides and bottom faces; angle members secured to the inner sides of said support members and having flanges above said bottom faces with bolt holes in said flanges, which flanges project toward one another; a fifth wheel plate having upwardly projecting portions with flanges having bolt holes, which flanges are positioned to engage the flanges of the inner sides of the support members in a location above the plane of said fifth wheel plate; bolts engageable with the bolt holes in the angle members and in the flanges of said upwardly projecting portions of the fifth wheel plate connecting said plate between said longitudinal members; and means securing the container to said cradles.

3. In a transportation vehicle having a container, frameless understructure comprising separate longitudinally spaced supporting devices each having a cradle engaging beneath said container, one of said cradles comprising longitudinally spaced, transverse, relatively narrow, parallel load-carrying bolsters fitting close against the container; transversely spaced, longitudinally extending support members connecting said bolsters and spaced out of contact with the container, said support members having inner sides and bottom faces; angle members secured to the inner sides of said support members and having flanges projecting toward one another and located above said bottom faces of the support members; a fifth wheel plate having upwardly projecting portions with flanges having bolt holes, which flanges are positioned to engage the flanges of the inner sides of the support members above the plane of said fifth wheel plate; bolts extending through the bolt holes in the angle members and through said flanges of the upwardly projecting portions of the fifth wheel plate for connecting said plate between said longitudinal members; spaced transverse supporting members connected to the upper side of the fifth wheel plate and extending between the upwardly projecting portions thereof; and means securing the container to said cradles.

4. In a transportation vehicle having an elongated container, frameless understructure comprising separate longitudinally spaced supporting devices each having a cradle engaging beneath said container, one of said cradles comprising longitudinally spaced, transverse, relatively narrow, parallel load carrying bolsters fitting close against the container; transversely spaced, longitudinally extending support members connecting said bolsters and having inner sides and bottom faces; a fifth wheel plate between said longitudinal support members and having a depending kingpin; cooperating means on said inner sides and plate for adjustably and reversibly securing said plate in position between said longitudinal members to bring the kingpin in a selected position longitudinally of the container, said cooperating means being located above the plane of said fifth wheel plate and above said bottom faces and there being openings located to provide access to said cooperating means; and means securing the container in said cradles.

5. In a transportation vehicle having an elongated container, frameless understructure comprising separate longitudinally spaced supporting devices each having a cradle engaging beneath said container, one of said cradles comprising longitudinally spaced, transverse, relatively narrow, parallel load carrying bolsters fitting close against the container; transversely spaced longitudinally extending support members connecting said bolsters and having inner sides and bottom faces; a fifth wheel plate between said longitudinal support members and having a depending kingpin; cooperating means on said inner sides and plate for adjustably and reversibly securing said plate in position between said longitudinal members to bring the kingpin in a selected position longitudinally of the container, said cooperating means being located above the plane of said fifth wheel plate and above said bottom faces and there being openings located to provide access to said cooperating means; means securing the container in said cradle; and small abutment plates welded to the container and positioned adjacent at least one of said bolsters and constituting the sole means for preventing relative longitudinal shifting between the container and said cradle.

6. In a transportation vehicle having a container, frameless understructure comprising separate longitudinally-spaced supporting devices, each having a cradle engaging beneath said container, one of said cradles comprising longitudinally spaced, transverse, relatively narrow, parallel load-carrying bolsters fitting close against the container, transversely spaced, longitudinally extending support members connecting said bolsters and spaced out of contact with the container, said support members having inner sides and bottom faces; brackets secured to the inner sides of said support members and having portions above said bottom faces which project toward one another; a fifth wheel plate having a lower face; means located above the plane of the lower face of said fifth wheel plate connecting said fifth wheel plate to said bracket portions in a position between said longitudinal members, with the lower face of the fifth wheel plate flush with the bottom faces of said support members; and means securing the container to said cradles.

References Cited in the file of this patent

UNITED STATES PATENTS

| | | |
|---|---|---|
| 2,376,854 | Saunders | May 22, 1945 |
| 2,412,146 | Hansen | Dec. 3, 1946 |
| 2,558,168 | Bernstein | June 26, 1951 |
| 2,606,039 | La Rue | Aug. 5, 1952 |
| 2,724,597 | Fowler | Nov. 22, 1955 |
| 2,792,231 | Compton | May 14, 1957 |